United States Patent [19]
Okuno

[11] Patent Number: 5,189,409
[45] Date of Patent: Feb. 23, 1993

[54] SYSTEM FOR CONTROLLING TERMINAL EQUIPMENT

[75] Inventor: Yasuo Okuno, Nara, Japan

[73] Assignee: Sharp Kabushiki Kaisha, Osaka, Japan

[21] Appl. No.: 762,179

[22] Filed: Sep. 20, 1991

Related U.S. Application Data

[63] Continuation of Ser. No. 565,205, Aug. 9, 1990, abandoned, which is a continuation of Ser. No. 186,084, Apr. 25, 1988, abandoned.

[30] Foreign Application Priority Data

Apr. 25, 1987 [JP] Japan .............................. 62-102763

[51] Int. Cl.⁵ ............................................ G05B 23/00
[52] U.S. Cl. .......................... 340/825.06; 340/825.57; 340/825.63
[58] Field of Search ...................... 340/825.06, 825.57, 340/825.63, 825.71, 825.64, 825.52; 902/22

[56] References Cited

U.S. PATENT DOCUMENTS

| | | | |
|---|---|---|---|
| 3,187,234 | 6/1965 | Muranak et al. | 340/825.71 |
| 3,511,923 | 5/1970 | Ameau . | |
| 3,671,939 | 6/1972 | Trimble | 340/825.71 |
| 4,430,652 | 2/1984 | Rothenbuhler et al. | 340/825.57 |
| 4,652,875 | 3/1987 | Waki | 340/825.44 |
| 4,668,949 | 5/1987 | Akahori et al. | 340/825.44 |
| 4,794,371 | 12/1988 | Yamamoto | 340/825.64 |
| 4,873,518 | 10/1989 | Mehnert | 340/825.52 |

FOREIGN PATENT DOCUMENTS 55-103672  8/1980  Japan .

OTHER PUBLICATIONS

Patent Abstracts of Japan, vol. 8, No. 49, Mar. 6, 1984 containing Abstract of Japanese Doc. 58-201450 dated Nov. 24, 1983.
Funkschau, vol. 12, 1980, pp. 101-102.

Primary Examiner—Donald J. Yusko
Assistant Examiner—Peter S. Weissman

[57] ABSTRACT

A terminal equipment control system which controls the operation state of multiple terminals having data communication with master equipment. A control signal of a specified duration is output from the master equipment to each of a plurality of multiple terminals, and the duration of the each control signal is measured by a measuring device provided in each terminal such that the current operation state of each terminal is changed when the measurement by the measuring device becomes equal to or larger than the specified duration.

20 Claims, 3 Drawing Sheets

SYSTEM FOR CONTROLLING TERMINAL EQUIPMENT

This application is a continuation of application Ser. No. 07/565,205 filed on Aug. 9, 1990 which is a continuation of Ser. No. 07/186,084 filed Apr. 25, 1988 now both abandoned.

BACKGROUND OF THE INVENTION

The present invention relates to a system for controlling the operation state of various types of terminal equipment involved in the point-of-sales (POS) system using a local area network (LAN).

The point-of-sales system (hereinafter abbreviated as POS system) has been used in department stores and supermarkets to control their sales data. The POS system comprises one or a plurality of terminal equipment such as electronic cash registers installed in one or multiple shop fronts, connected to a master equipment that may be of the same form as the terminal equipment. When commodities are sold at a shop front, sales data such as the name, quantity and unit price of each commodity and total sum of money are input in a terminal equipment. The input data is directly sent to the master equipment where the data are aggregated and processed in real time.

In the conventional POS system, all units of terminal equipment installed are turned ON or OFF simultaneously by an appropriate instruction data given from the master equipment. Alternatively an operator must turn ON or OFF each terminal equipment manually.

With the conventional terminal equipment control system, operation for turning ON or OFF the terminal equipment is very complicated. Besides, even for terminal equipment which is not presently used, it may be necessary to install personnel to turn OFF the terminal equipment.

SUMMARY OF THE INVENTION

The object of the present invention is to solve the above problems by providing a terminal equipment control system of remarkably improved operatability, and capable of changing the operation state of terminal equipment connected to master equipment by remote control from the master equipment.

According to the present invention, a system for controlling the operation state of terminal equipment which communicates with master equipment comprises: a circuit for outputting a control signal of a preset duration from the master equipment; and a circuit provided in the terminal equipment, for measuring the duration of said signal from the master equipment, so that the current operation state of the terminal equipment is changed only when the measurement by the measuring means becomes equal to or larger than said specified duration.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 2:
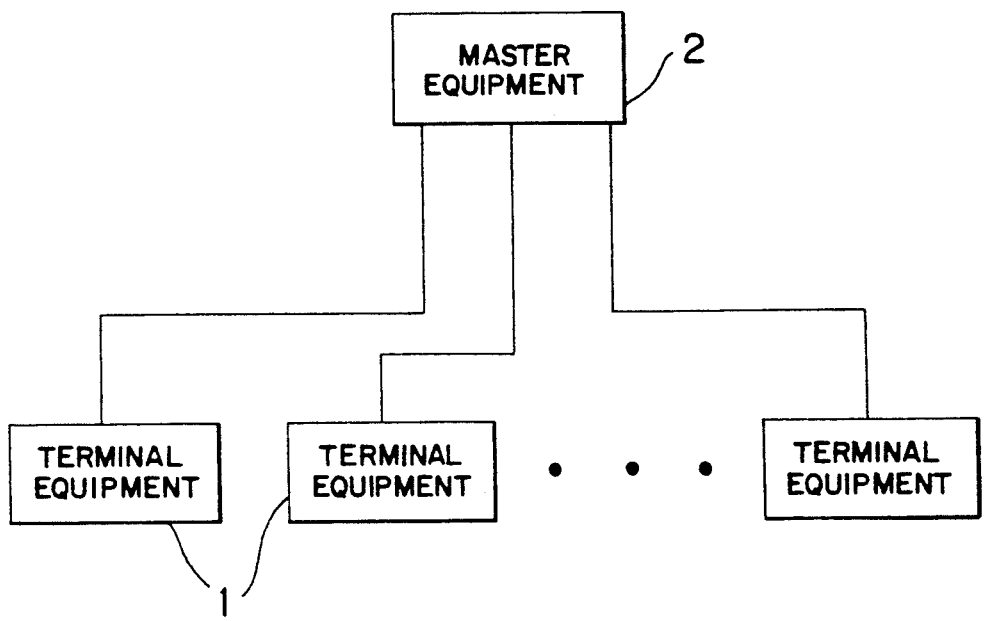
FIG. 2 is a block diagram showing the basic construction of the POS system.

FIG. 2 is a block diagram schematically showing the construction of the POS system related to the present invention. The POS system is widely employed by retail stores such as department stores and supermarkets. Referring to FIG. 2, the POS system comprises one or plural units of terminal equipment 1 in form of, for example, electronic cash registers installed in a shop front, each connected to master equipment 2 of the same form as the terminal equipment or of another form installed, say, in a business control center.

Figure 1:
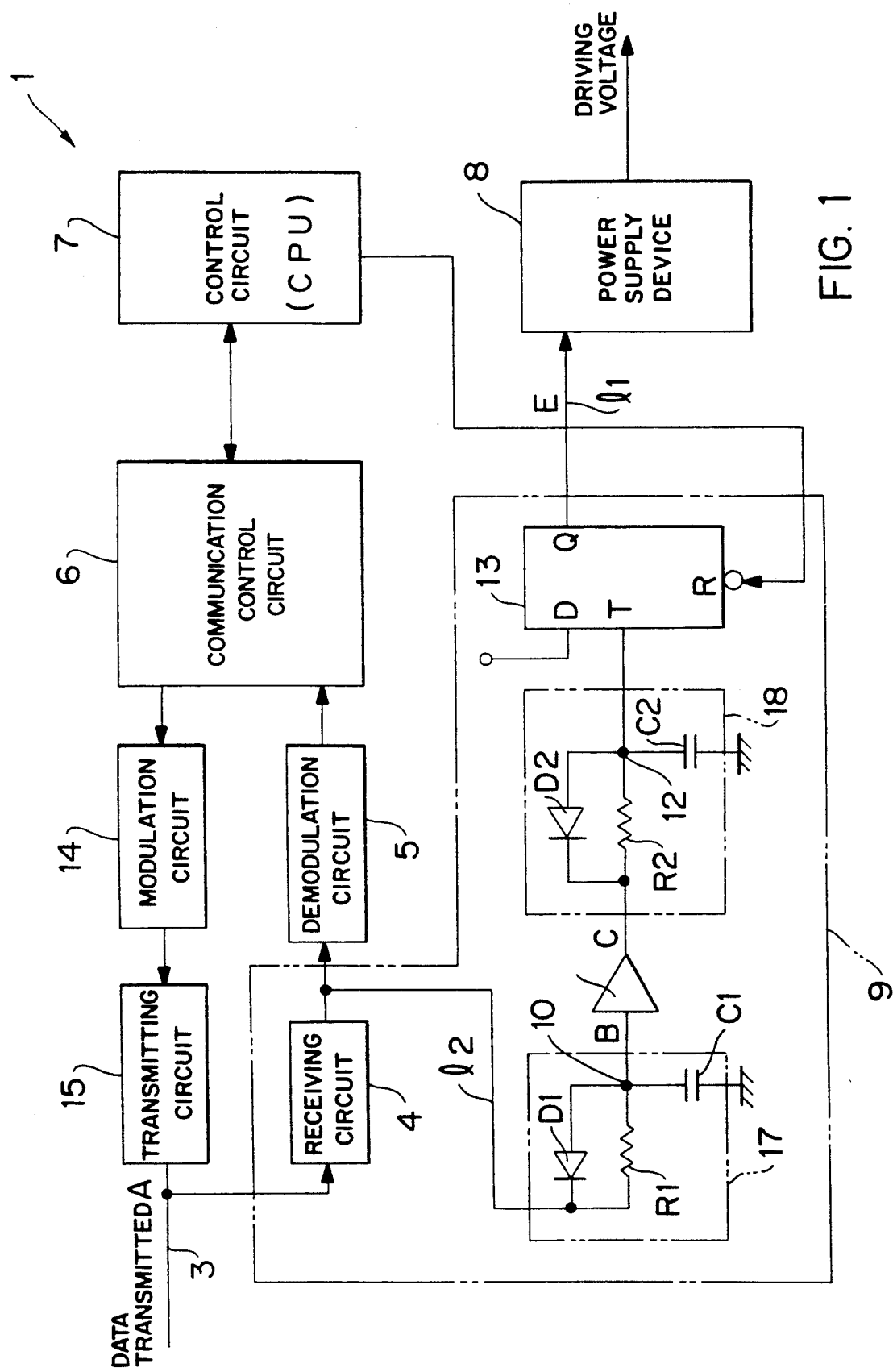
FIG. 1 is a block diagram showing the electrical connection of terminal equipment 1 related to an embodiment of the present invention.

FIG. 1 is an electrical block diagram of the terminal equipment 1 involved in the POS system. Referring to FIG. 1, the terminal equipment 1 is connected through a data line 3 with the master equipment 2. The data line 3 is connected to a receiving circuit 4 which receives a signal sent via the data line 3. The output of the receiving circuit 4 is connected to a demodulation circuit 5 to obtain a data signal.

The data signal output from the demodulation circuit 5 is sent through a communication, control circuit 6 to a control circuit 7 realized by, for example, a microprocessor which processes the data signal for storing in a memory and outputting to a display.

The terminal equipment 1 contains a power supply device 8 which reduces the supply voltage from a commercial ac power line to a specified voltage to drive the terminal equipment 1. The power supply device 8 is actuated or stopped by means of a control signal "E" sent via a line 11 from a power control circuit 9.

The receiving circuit 4 is included in the power control circuit 9. The output of the receiving circuit 4 is connected via a branch line (2 to a parallel circuit which comprises a resistor R1 and a diode D1 connected inversely. The other end of the parallel circuit is connected at a node 10 with an end of a capacitor C1 whose other end is grounded. A waveform shaping device 11 is connected to the node 10. The diode D1, the resistor R1 and the capacitor C1 constitute an integration circuit 17.

The output of the waveform shaping device 11 is connected to another integration circuit 18 which comprises a diode D2, a resistor R2 and a capacitor C2 which are connected one another in the same manner as the diode D1, the resistor R1 and the capacitor C1. The integration circuits 17 and 18 constitute measuring means. A node 12 between the anode of the diode D2 and the capacitor C2 is connected to the clock input terminal "CK" of a flip flop circuit 13. The data input terminal "D" of the flip flop circuit 13 is connected with a power line, and the output terminal "Q" with the line 11.

The control circuit 7 inputs a reset signal to the reset input terminal "R" of the flip flop circuit 13. To output data to the master equipment 2, the data is sent through the communication control circuit 6 to a modulation circuit 14 for modulation into an appropriate form and output through a transmitting circuit 15 to the data line 3.

Figure 3:
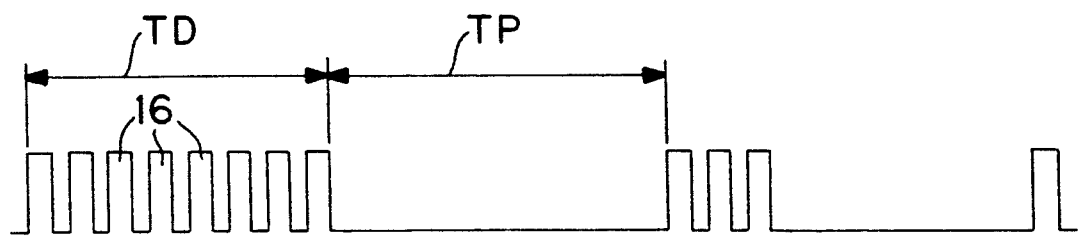
FIG. 3 is a timing chart of the signal transmitted to the terminal equipment.

FIG. 3 shows the signal waveform of data transmitted between the master equipment 2 and the terminal equipment 1 shown in FIGS. 1 and 2. Referring to FIG. 3, a typical signal transmitted comprises a data time "TD" during which signal pulses 16 exist and a pose time "TP" during which no signal pulses 16 exist. The maximum time "Tmax" and the minimum time "Tmin" of the data time "TD" have been set in advance to satisfy the relation represented by the following expression:

$$Tmin \leq TD \leq Tmax \qquad (1).$$

Specifically, the minimum time "Tmin" has been set to such a value as to allow the capacitor C1 of the integration circuit 17 of FIG. 1 to be charged completely in the duration of the signal pulses 16 of FIG. 3. The maximum time "Tmax" has been set to such a value as to allow the capacitor C2 of the integration circuit 18 of FIG. 1 to be charged completely when the signal pulses 16 are sent for the maximum time "Tmax" plus the pose time "TP" of FIG. 3. The pose time "TP" has been set to such a value as to allow the capacitors C1 and C2 of the integration circuits 17 and 18, respectively, to be discharged completely within the pose time "TP".

Figure 4:
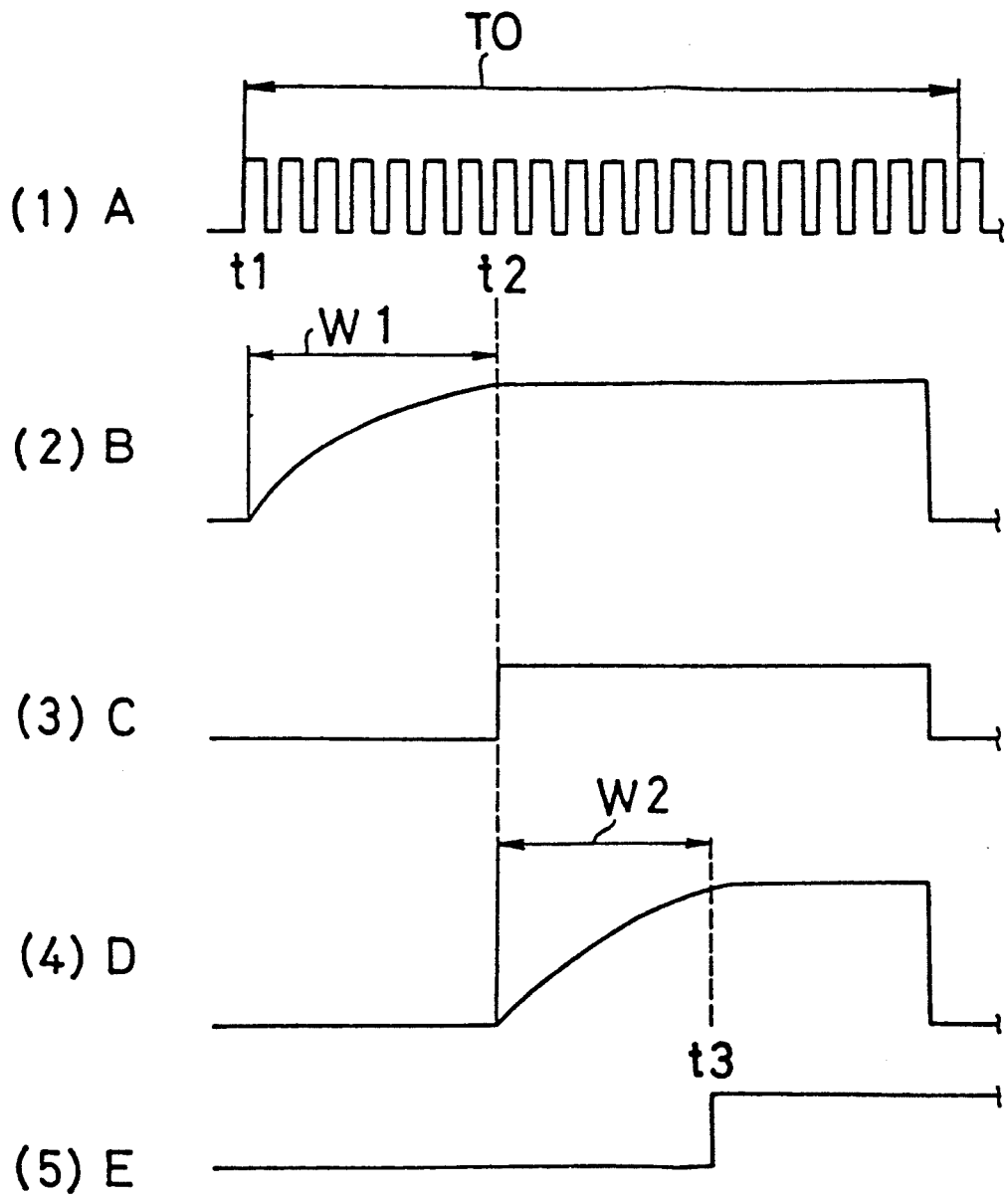
FIG. 4 is a timing chart for explaining the operation of the control system of the present invention.

FIG. 4 is a timing chart for explaining the operation of the control system of the present invention for turning ON/OFF the terminal equipment 1. The operation of the control system of the present invention is described for the case where desired terminal equipment 1 is turned ON/OFF by a signal sent from the master equipment 2. To turn ON the terminal equipment 1, a control data "A" shown in FIG. 4 (1) is transmitted from the master equipment 2 to the data line 3. The duration "T0" of the control data "A" satisfies the following relation with the maximum time "Tmax" and the pose time "TP":

$$T0 \leq Tmax + TP \qquad (2).$$

The control data "A" permits the capacitor C1 of the integration circuit 17 to be charged electrically so that the potential at the node 10 is output as a signal "B" from the integration circuit 17. The waveform of the signal "B" is shown in FIG. 4 (2). The master equipment 2 starts sending the control signal "A" at a time "t1" of FIG. 4 (1). The output "B" from the integration circuit 17 reaches a specified level at a time "t2" after a delay time W1 determined by the electric constants of the resistor R1 and capacitor C1, respectively. Simultaneously, the output "C" of the waveform shaping device 11 rises from "L" level to "H" level, as shown in FIG. 4 (3). The output "C" thus obtained after the time "t2" permits the integration circuit 18 to be charged electrically as indicated in the FIG. 4 (4). The output "D" of the integration circuit 18 reaches a specified level at a time "t3" after a delay time W2 determined by the electric constants of the resistor R2 and capacitor C2, respectively.

When the output "D" of the integration circuit 18 reaches the specified level at the time "t3" as shown in FIG. 4 (4), it is taken as input into the flip flop circuit 13, whereby a control signal "E" from the output terminal "Q" of the flip flop circuit 13 changes to high level as shown in FIG. 4 (5). As long as the control signal "E" is at high level, the power supply device 8 supplies power to the terminal equipment 1.

To turn OFF the terminal equipment 1, the master equipment 2 outputs an instruction data following a specified grammatical rule. When the control circuit 7 of the terminal equipment 1 reads the instruction, it outputs a signal to the reset input terminal "R" of the flip flop circuit 13, causing the flip flop circuit 13 to output the control signal "E" at low level. As a result, power from the power supply device 8 is shut off, thereby turning OFF the terminal equipment 1.

Here, the duration of the control data "A" of FIG. 4 (1) is longer than the maximum conceivable length of data to be transmitted, preventing the terminal equipment 1 once turned OFF from being turned ON erroneously by data transmitted thereafter by the master equipment 2.

According to the present invention, as mentioned above, the terminal equipment 1 is turned ON or OFF by means of such a circuit construction as represented by the power control circuit 9 of FIG. 1 which is remote controlled with a control signal "A" from the master equipment 2. As a result, the operability of the POS system is remarkable improved, eliminating the waste of labor in turning ON or OFF the terminal equipment 1.

In the above embodiment of the present invention, the duration "T0" of the control data "A" shown in FIG. 4 (1) is detected by the power control circuit 9. Alternatively, a counter or other appropriate means may be used in place of the power control circuit 9 as long as it is capable of detecting the duration of data transmitted through the data line 3.

According to the present invention, as understood from the above, the master equipment outputs a control signal of a specified duration to a terminal equipment. The duration of the control signal is measured by measuring means provided in the terminal equipment. When the measured result becomes equal to or longer than a preset value, the current operation state of the terminal equipment is changed.

Accordingly, the operation state of the terminal equipment can be changed without an instruction data following a specified grammatical rule, given from the master equipment. Therefore, the terminal equipment need not interpret the instruction for changing the state of the terminal equipment. Consequently, the circuit construction for changing the state of the terminal equipment can be made extremely simple, and the operation time is drastically shortened, as compared to the operation time in the case of interpreting instruction data.

While only certain embodiments of the present invention have been described, it will be apparent to those skilled in the art that various changes and modifications may be made therein without departing from the spirit and scope of the present invention as claimed.

What is claimed is:

1. A system for individually controlling the operation state of multiple terminals in a data communication system by means of a master control; comprising:
   means for outputting various individual control preset signals of various preset durations from said master control to each of said multiple terminals, the output control signals comprising data time and pose time the data time, being time when a plurality of adjacent pulses exists, the pose time being distinct and separate from said pules and time when there are no pulses;
   means provided in each of said multiple terminals, for measuring the duration of control signal which includes said data and pose time output from said master control; and means for supplying power supply voltage to each of said multiple terminals, independent of all other terminals when the measuring by said means for measuring of the control signals which includes the data and pose time, becomes equal to or larger than said preset duration, wherein the power supply voltage and the output control signals are carried by a common line.

2. The system of claim 1 wherein said means for measuring includes a plurality of integration circuits operatively connected to each other and to a flip flop; and each integration circuit includes a capacitor.

3. The control system of claim 1, wherein said control system is adapted to a point-of-sales system.

4. The control system of claim 1, wherein the operation of turning ON/OFF the power of said multiple terminals is remotely controlled by a control signal from said master equipment.

5. A system for individually controlling a selected subset of a plurality of individual terminals from a master control terminal, comprising:

presetting means, provided in each of said plurality of individual terminals, for receiving a signal of a preset duration from said master control terminal and presetting each individual terminal with said signal of a preset duration;

control signal sending means for sending a control signal of a specified duration to a selected subset of said plurality of individual terminals, respectively, from said master control signal the control signal comprising data time, and pose time the data time being time when a plurality of adjacent groups of plural pulses exists, the post time separating the groups and being a distinct time from the pulses and including time when no pulses exist;

measuring means, providing in each of said individual terminals, for measuring the duration of the control signal which includes the data time and pose time; and operation state changing means for changing the current operation state of a selected subset of said plurality of individual terminals by applying power supply voltage, when the measured control signal duration which includes the data and pose time, is equal to or larger than the duration of the preset signal.

6. The system of claim 5 wherein said measuring means includes a plurality of integrated circuits operatively connected to each other and to a flip-flop.

7. The system of claim 5, wherein said system is a control system for a point-of-sales system.

8. The system of claim 5, wherein the current operation state changed is that of turning the power ON/OFF for equipment connected to each of said plurality of terminals is an electronic cash register.

9. The system of claim 8, wherein the equipment connected to each of said plurality of terminals is an electronic cash register.

10. A method of individually controlling operation at a selected subset of a plurality of individual terminals from a master control terminal, comprising the steps of:

(a) presetting each of said plurality of individual terminals with a signal of a different preset duration, sent from said master control terminal;

(b) sending a control signal, which comprises data time and pose time the data time being time when a plurality of adjacent pulse exists, the pose time being distinct and separate from said pulses, of a specified duration to a selected subset of said plurality of individual terminals, respectively, from said master control terminal;

(c) measuring the duration of said control signal which includes data and pose time, at each of said plurality of individual terminals; and (d) applying power supply voltage to a selected subset of said plurality of terminals, when the measured duration of the control signal, which includes the data and pose time, is equal to or larger than the duration of the signal of the preset duration.

11. A method of claim 10, wherein the current operation state changed is that of turning the power ON/OFF for equipment connected to each of said plurality of terminals.

12. The method of claim 11, wherein the equipment connected to each of said plurality of terminals is an electronic cash register.

13. The method of claim 10, wherein said method is used in controlling a point-of-sales system.

14. The system of claim 1 further including data line means for connecting said means for outputting to each of said terminals;

receiving circuit means responsive to said means for outputting;

said receiving circuit means operatively connected to said measuring means; and said measuring means operatively connected to a variable power supply means for turning power on/off for a terminal.

15. The system of claim 2 wherein said flip-flop is operatively connected to a variable power means for turning the power on and off for a terminal.

16. The system of claim 6 wherein said flip-flop is operatively connected to a variable power means for turning the power on and off for a terminal.

17. The system of claim 2 wherein the means for changing includes charging a capacitor of one of said plurality of integration circuits.

18. The system of claim 17 wherein the means for changing includes charging a capacitor of another of said plurality of integration circuits.

19. A method of individually controlling operation at a selected subset of a plurality of individual terminals from a master control terminal, comprising the steps of:

(a) presetting each of said plurality of individual terminals with a signal of a different preset duration, sent from said master control terminal;

(b) sending to said plurality of individual terminals from said master terminal a control signal for a specific duration of time, the control signal comprising data time, the data time being time when a plurality of groups of pulses exists each group including a plurality of adjacent pulses, and pose time which includes continuous time between each group when no pulses exists;

(c) charging a capacitor of a first integration circuit operatively connected to the master control terminals during a duration of the control signal;

(d) after charging the capacitor in step (c) outputting a signal from the first integration circuit to a first specified level and simultaneously raising the output level of the signal by a value shaping device having an output operatively connected to a second integration circuit; and (e) outputting a signal from the second integration circuit to a flip flop to change a control signal of the flip flop from a first value to a higher value to turn a power supply so that power is supplied to the terminal is supplied to the equipment.

20. The method of claim 19 wherein a capacitor of said second integration circuit is charged after charging the capacitor in step (c) during the duration of the control signal.

* * * * *